United States Patent
Miyoshi et al.

(10) Patent No.: US 7,457,456 B2
(45) Date of Patent: Nov. 25, 2008

(54) IMAGE GENERATION METHOD AND DEVICE

(75) Inventors: Takashi Miyoshi, Atsugi (JP); Hidekazu Iwaki, Tokyo (JP); Akio Kosaka, Tokyo (JP)

(73) Assignee: Olympus Corporation, Tokyo (JP)

( * ) Notice: Subject to any disclaimer, the term of this patent is extended or adjusted under 35 U.S.C. 154(b) by 243 days.

(21) Appl. No.: 11/194,751

(22) Filed: Aug. 1, 2005

(65) Prior Publication Data
US 2006/0029271 A1  Feb. 9, 2006

(30) Foreign Application Priority Data
Aug. 4, 2004  (JP)  ............... 2004-228541

(51) Int. Cl.
*G06K 9/00*  (2006.01)
(52) U.S. Cl. ...................... 382/154; 382/291
(58) Field of Classification Search .......... 382/154, 382/291
See application file for complete search history.

(56) References Cited

U.S. PATENT DOCUMENTS

| | | | | |
|---|---|---|---|---|
| 5,177,606 | A * | 1/1993 | Koshizawa | 348/118 |
| 2003/0025799 | A1 * | 2/2003 | Holz et al. | 348/207.99 |
| 2003/0081815 | A1 * | 5/2003 | Shima et al. | 382/106 |

FOREIGN PATENT DOCUMENTS

| | | |
|---|---|---|
| CN | 1128600 | 8/1996 |
| EP | 0 700 212 | 10/1995 |
| JP | 05-310078 | 11/1993 |
| JP | 10-164566 | 6/1998 |
| JP | 3286306 | 5/2002 |

OTHER PUBLICATIONS

Massimo Bertozzi and Alberto Broggi, "GOLD: A Parallel Real-Time Stereo Vision Systenm for Generic Obstacle and Lane Detection," Jan. 1998, IEEE Transactions on Image Processing, vol. 7, No. 1, pp. 62-81.*
Bertozzi et al., "Artificial Vision in Road Vehicles," Jul. 2002, Proceedings of the IEEE, vol. 90, No. 7, pp. 1258-1271.*
Alberto Broggi and Simona Berte, "Vision-Based Road Detection in Automotive Systems: A Real-Time Expectation-Driven Approach," Dec. 1995, Journal of Artificial Intelligence Research 3 (1995), pp. 325-348.*
Chinese First Notification of Office Action for Chinese Patent Application No. 200510091146.2, dated Jan. 25, 2008 (5 pgs.) (with translation 7 pgs.).

* cited by examiner

*Primary Examiner*—Samir A Ahmed
*Assistant Examiner*—Stephen R Koziol
(74) *Attorney, Agent, or Firm*—Straub & Pokotylo; John C. Pokotylo

(57) ABSTRACT

An image generation method for generating a viewpoint-modified image is carried out based on camera information sensed by one or a plurality of image sensing unit sensing an image around an image sensing unit-disposed object. The image generation method comprises displaying an image sensing unit-disposed object model on the viewpoint-modified image, detecting the change of the movable member of the image sensing unit-disposed object and transforming/displaying the relevant part of the image sensing unit-disposed object model in the viewpoint-modified image. The image generation method can also comprise transforming/displaying the virtual viewpoint position of the viewpoint-modified image, according to the amount of change of the movable member of the image sensing unit-disposed object.

10 Claims, 15 Drawing Sheets

IMAGE GENERATION METHOD AND DEVICE

CROSS REFERENCE TO RELATED APPLICATIONS

This application claims benefit of Japanese Application No. 2004-228541, filed Aug. 4, 2004, the contents of which are incorporated by this reference.

BACKGROUND OF THE INVENTION

1. Field of the Invention

The present invention relates generally to an image generation method and device, and more particularly to a technology for combining one or a plurality of images sensed by an camera unit into an image whose sensing viewpoint is modified as if they were actually sensed from another viewpoint and displaying them.

2. Description of the Related Art

Generally, when monitoring using a monitor camera or the like, it is designed that an image sensed by a camera is displayed on a monitor, and an image sensed by a camera mounted in the desired place of a monitor area is displayed on a plurality of monitors arrayed in a monitor room. In order to contribute to safe driving, a camera is mounted on a vehicle, an area which an driver cannot directly or indirectly see is sensed using a camera directed toward the rear of the vehicle and such an image is displayed on a monitor provided in a driver seat.

However, since such a monitor device displays an image for a camera, a lot of cameras must be set in order to sense a wide area. If a wide-angle camera is used, the number of cameras decreases. However, since the accuracy of an image displayed on a monitor is rough, the displayed image is difficult to see and its monitor function degrades. In such a situation, a technology for combining a plurality of camera images into one image and displaying it is proposed. For example, in the following Reference 1, a plurality of camera images can be displayed in the divided areas of one monitor. In Reference 2, a plurality of cameras can be disposed in such a way that its sensed images can be partially overlapped, and it can be combined in its overlapped part into one image. In Reference 3, by combining the images of a plurality of cameras into one image by coordinate transformation, an image combined from an arbitrary viewpoint can be displayed.

In Reference 3, each piece of the image data of a plurality of cameras is one-dimensionally taken in and a three-dimensional space model is generated according to known information. Then, in this three-dimensional space model, this obtained image data is mapped according to the information of each pixel constituting an image inputted from a camera, based on its camera parameter to generate space data. After relating the images of all independent cameras to the three-dimensional space as a point in it in this way, a viewpoint-modified image which is viewed from an arbitrary virtual viewpoint instead of an actual camera viewpoint can be generated and displayed. According to such a viewpoint-modified image display method, the entire monitor area can be displayed from one arbitrary viewpoint without degrading image accuracy, and an area to monitor can be monitored from an arbitrary viewpoint.

Reference 1: Japanese Patent Application KOKAI Publication No. H05-310078

Reference 2: Japanese Patent Application KOKAI Publication No. H10-164566

Reference 3: Japanese Patent No. 3286306

SUMMARY OF THE INVENTION

One aspect of the present invention is an image generation method for generating a viewpoint-modified image according to the camera information of one or a plurality of image sensing unit sensing an image around an object in which an image sensing unit is disposed. The image generation method simultaneously displays an image sensing unit-disposed object model on the viewpoint-modified image. Then, the image generation method also detects the change of the movable member of the image sensing unit-disposed object and transforms/displays the relevant part of the image sensing unit-disposed object model in the viewpoint-modified image. In this case, displayed emergency information can be updated based on the degree of approach to a displayed obstacle, according to the transformation/display of the image sensing unit-disposed object model.

BRIEF DESCRIPTION OF THE DRAWINGS

The present invention will be more apparent from the following detailed description when the accompanying drawings are referenced.

DESCRIPTION OF THE PREFERRED EMBODIMENTS

Figure 1:
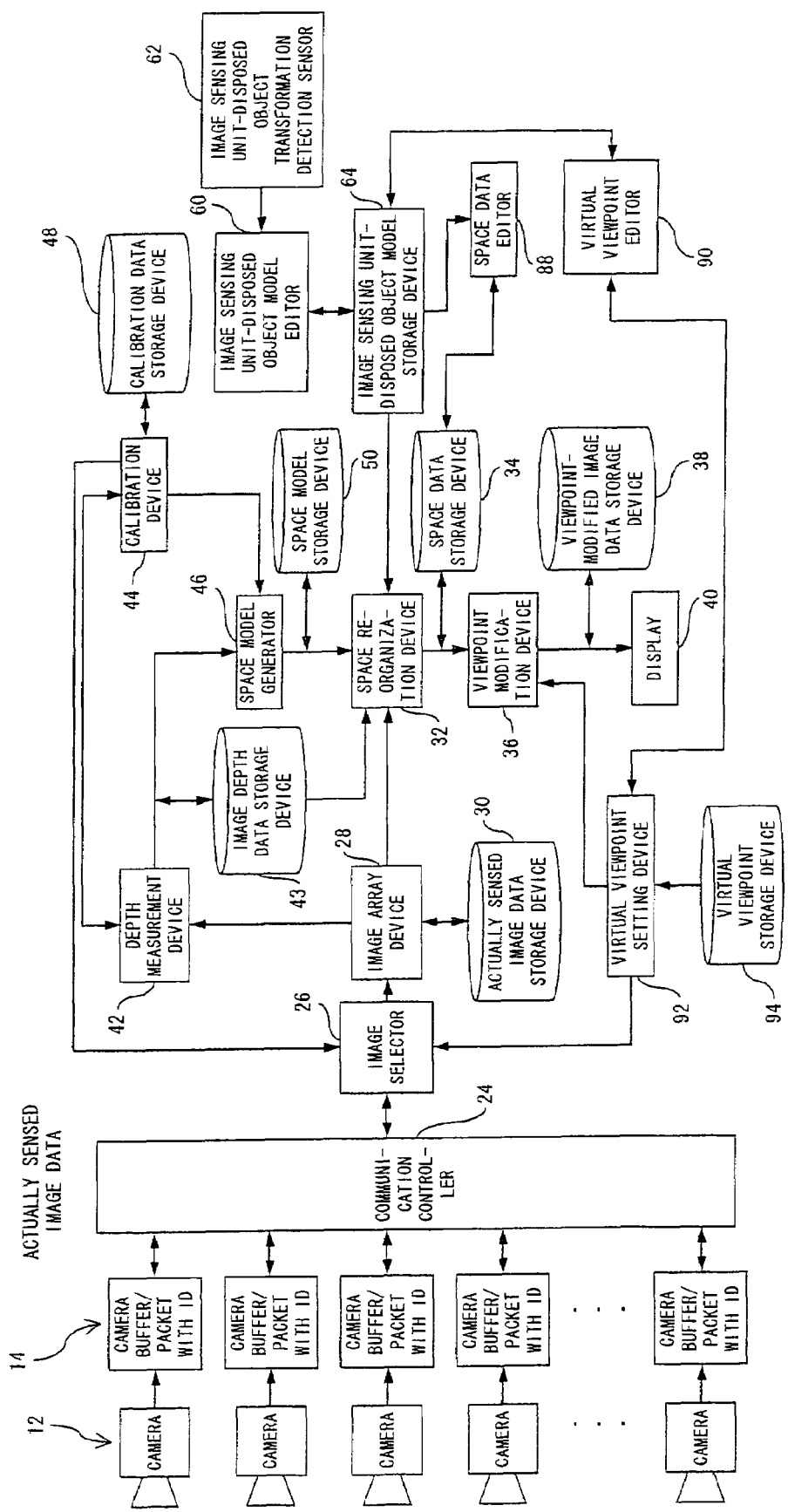
FIG. 1 shows the system configuration of the image generation device in the preferred embodiment.

The preferred embodiments of the present invention are described below with reference to the drawings.

The image generation method of the present invention generates a viewpoint-modified image according to the image sensing information of one or a plurality of image sensing unit sensing an image around an object in which an image sensing unit is disposed. The image generation method simultaneously displays an image sensing unit-disposed object model in the viewpoint-modified image. Then, the image generation method also detects the change of the movable member of the image sensing unit-disposed object and transforms/displays the relevant part of the image sensing unit-disposed object in the viewpoint-modified image.

In this case, displayed emergency information can be updated according to the degree of approach to an obstacle displayed according to the transformation of the image sensing unit-disposed object model. The emergency information can also be displayed by changing its color. Furthermore, the setting of the virtual viewpoint of a viewpoint-modified image can be modified according to the change of the movable member.

When generating a viewpoint-modified image according to the image sensing information obtained from one or a plurality of image sensing unit mounted on an image sensing unit-disposed object, the image generation method of the present invention can also display an image sensing unit-disposed object model in the viewpoint-modified image and also can change/display the virtual viewpoint position of the viewpoint-modified image according to the amount of change of the movable member of the image sensing unit-disposed object. The movable member includes a cargo externally loaded.

The image generation device of the present invention comprises one or a plurality of image sensing units mounted on an image sensing unit-disposed object, for sensing an image around it, a viewpoint-modified image generation unit generating a viewpoint-modified image viewed from a predetermined virtual viewpoint, based on image data obtained from this image sensing unit and a space model and an image sensing unit-disposed object model update unit transforming the display form of the relevant part of the image sensing unit-disposed object model, based on the change of the movable member of the image sensing unit-disposed object in an image generation device provided with an image sensing unit-disposed object model overlapping unit overlapping the image sensing unit-disposed object model in this viewpoint-modified image generation unit.

The viewpoint-modified image generation unit can also comprise an emergency information display unit displaying the degree of emergency, based on the movable member position updated by the image sensing unit-disposed object model update unit and the degree of approach to a displayed obstacle. In this case, it is preferable to comprise a viewpoint update unit modifying the virtual viewpoint of the viewpoint-modified image, based on the change of the movable member of the image sensing unit-disposed object. Furthermore, the image sensing unit-disposed object can also be a vehicle.

The specific configurations of the most preferred embodiment of the image generation method and device are described in detail below with reference to the drawings.

Figure 2:
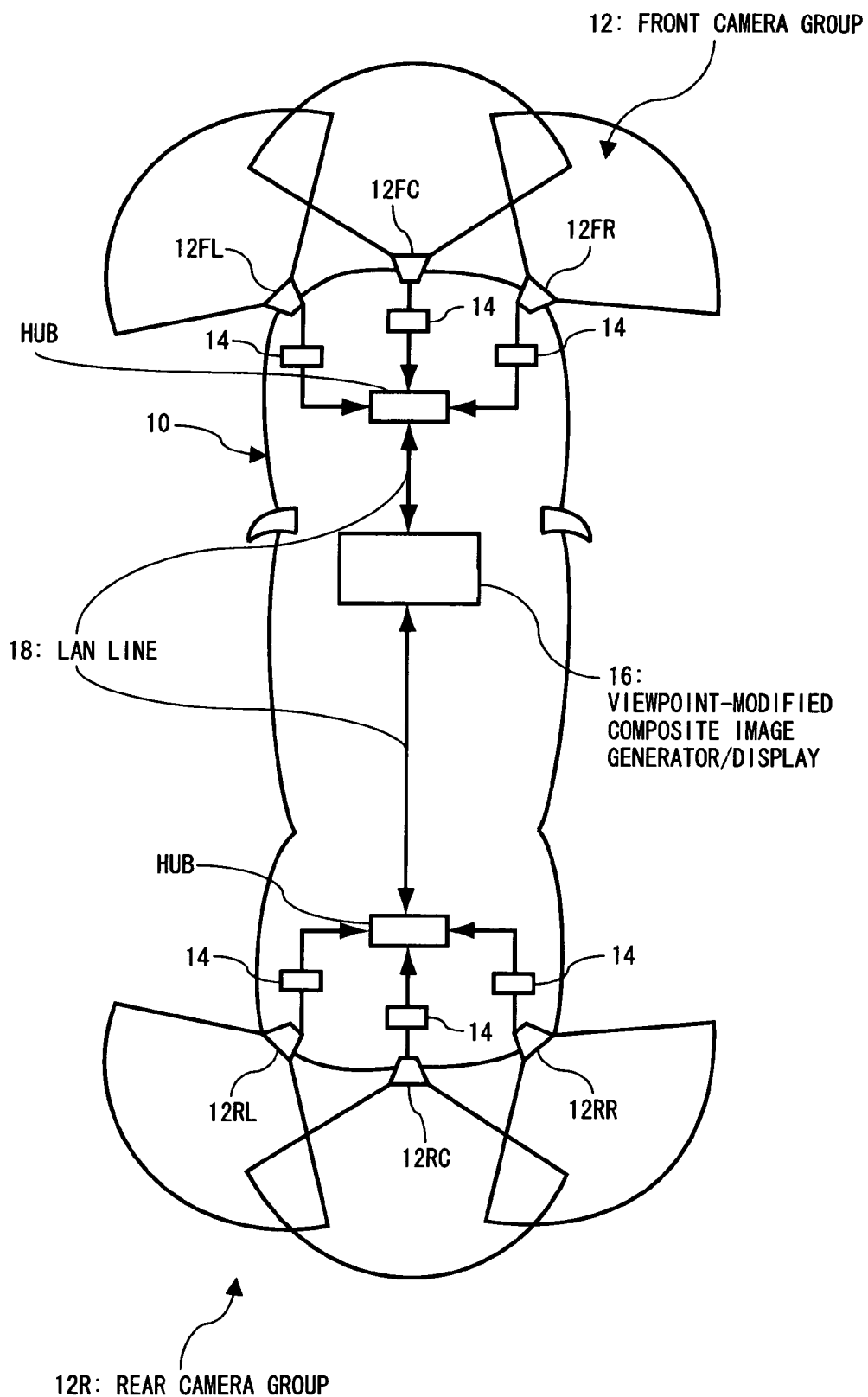
FIG. 2 shows the structure of a vehicle provided with the image generation device in the preferred embodiment.

FIG. 1 shows the system configuration of the image generation device in the preferred embodiment. FIG. 2 shows the structure of a vehicle 10 provided with the image generation device in the preferred embodiment in such a way that a surrounding condition can be monitored supplement driving when driving a vehicle. This system basically comprises a plurality of cameras 12 as image sensing unit and a viewpoint-modified composite image generation/display device 16 for processing image data obtained by these cameras 12 and reproducing/displaying it as a composite image viewed from a virtual viewpoint different from a camera viewpoint.

Firstly, as shown in FIG. 2, in this preferred embodiment, a plurality of cameras 12 as an image sensing unit is provided at the front and rear of a vehicle 10 as an image sensing unit-disposed object. In FIG. 2, a front camera group 12F (12FR, 12FC and 12FL) are provided at the front of the vehicle 10, and the three cameras 12 sense images in the right-side 45-degree direction of the vehicle front, in the center front and in the left-side 45-degree direction of the vehicle front, respectively. And a rear camera group 12R (12RR, 12RC and 12RL) as the image sensing unit are provided at the rear of the vehicle 10, and the three cameras 12 sense images in the right-side 45-degree direction of the vehicle rear, in the center rear and in the left-side 45-degree direction of the vehicle rear, respectively.

The vehicle 10 further comprises a viewpoint-modified composite image generation/display device 16 for combining images as if each image sensed by the camera were sensed from an arbitrary viewpoint different from that of the camera. This viewpoint-modified composite image generation/display device 16 and each camera 12 are connected by a LAN line 18 via a HUB, and image data is packet-transmitted via a camera buffer device 14. In this way, since necessary image data uniquely determined for each predetermined virtual viewpoint is selected/extracted from the camera buffer device 14, is rapidly taken in by packet transmission and is combined to display, image display speed can be improved and a composite image can be rapidly displayed.

The viewpoint-modified composite image generation/display device 16 basically inputs an image sensed from the viewpoint of each camera 12, sets a three-dimensional space in which an image sensing unit-disposed object, such as a vehicle or the like, is disposed, specifies an origin (virtual viewpoint) arbitrarily set in this three-dimensional space, relates the pixels of the image data in the three-dimensional space from the specified virtual viewpoint by coordinate-transforming the pixels and re-arranges the pixels on an image plane viewed from the virtual viewpoint. Thus, the pixels of image data obtained from a camera viewpoint can be re-arranged and combined in a three-dimensional space specified a virtual viewpoint to generate, output and display a composite image viewed from a desired viewpoint instead of that of a camera.

In this system, image data sensed by each camera 12 is packet-transmitted. Therefore, the camera buffer device 14 is added to the camera 12 as an image sensing unit, and temporarily stores the sensed image in its buffer memory.

In this buffer device, an ID is attached to each piece of sensed image data. The ID also includes at least one of time stamp, image sensing unit position/posture information, internal image sensing unit parameter, and exposure information. Thus, image data transmitted from each camera 12 is continuously packet-transmitted from the buffer device to the viewpoint-modified composite image generation/display device 16 with an ID attached and also including time stamp and other camera information.

Although image data is transmitted to the viewpoint-modified composite image generation/display device 16 for receiving image data from the camera 12 via a communication control device 24, image data to be obtained from each camera 12 is uniquely determined by a predetermined virtual viewpoint. Therefore, the viewpoint-modified composite image generation/display device 16 comprises an image selection device 26 to obtain image data corresponding to the predetermined virtual viewpoint. An image data packet corresponding to the predetermined virtual viewpoint is selected from image data packets inputted from the camera buffer device 14 added to an arbitrary camera 12 by this image selection device 26 and is used for an image combination process later.

Since the sensed image is temporarily stored in the camera buffer device 14 for each piece of image data with an ID by packet transmission, a plurality of pieces of image data with the same time can be combined using ID information. Therefore, the viewpoint-modified composite image generation/display device 16 further comprises an image arraying device 28 for time-sequentially arraying sensed images from the plurality of cameras 12, according to ID information and an actually sensed image data storage device 30 for time-sequentially storing the sensed images.

In this case, if the parameters of the plurality of pieces of obtained data are not synchronous, a composite image differs from an actually sensed image. Therefore, as earlier described, it is OK if the ID includes at least one of time stamp, image sensing unit position/posture information, internal image sensing unit parameter, exposure information and the plurality of image data to be plotted in the three-dimensional space are adjusted, as requested.

The vehicle 10 provided with the system of the preferred embodiment further comprises a depth measurement device 42 for measuring a depth from a movable obstacle. In this preferred embodiment, this depth measurement device 42 measures a depth by laser radar, millimetric wave radar or the like.

When measuring a depth by radar, an ordinary system for measuring a depth, based on a time difference between a transmitted signal and a reflected signal can be used. Image depth data generated by the depth measurement device 42 is stored in a depth data storage device 43.

Furthermore, the viewpoint-modified composite image generation/display device 16 comprises a space model generation device 46. The space model generation device 46 generates a space model, using image data, image depth data by the depth measurement device, calibration data.

A calibration device 44 determines and specifies a camera parameter for indicating a camera characteristic, such as the mounting position of an image sensing unit, a mounting angle, a lens distortion correcting value, the focal distance or the like in the three-dimensional real world. A camera parameter obtained by the calibration is stored in a calibration storage device 48 as calibration data.

Therefore, the space model generation device 46 generates a space model, using the image data, image depth data and calibration data. The generated space model is stored in a space model storage device 50.

A space re-organization device 32 relates each pixel of image data selectively taken in thus to a point in the three-dimensional space and generates space data. In this way, it is calculated where each object constituting a selected image is located, and space data as a result of the calculation is temporarily stored in a space data storage device 34.

A viewpoint modification device 36 reads the space data generated by the space re-organization device 32 and re-produces an image viewed from the specified virtual viewpoint. This is a process the reverse of the process performed by the space re-organization device 32. In this way, an image viewed from a new modified viewpoint is generated based on the data read from the space data storage device 34, and after being stored in a viewpoint-modified image data storage device 38, the image is displayed as a viewpoint-modified image by a display device 40.

In this preferred embodiment, since an image data packet from a necessary image sensing unit according to the shift of the virtual viewpoint in the viewpoint modified image is obtained with priority, there is no extra data process and the speed of image combination process is improved, which is highly effective in its application to a mobile object requiring a real time response, such as a vehicle.

Figure 3:
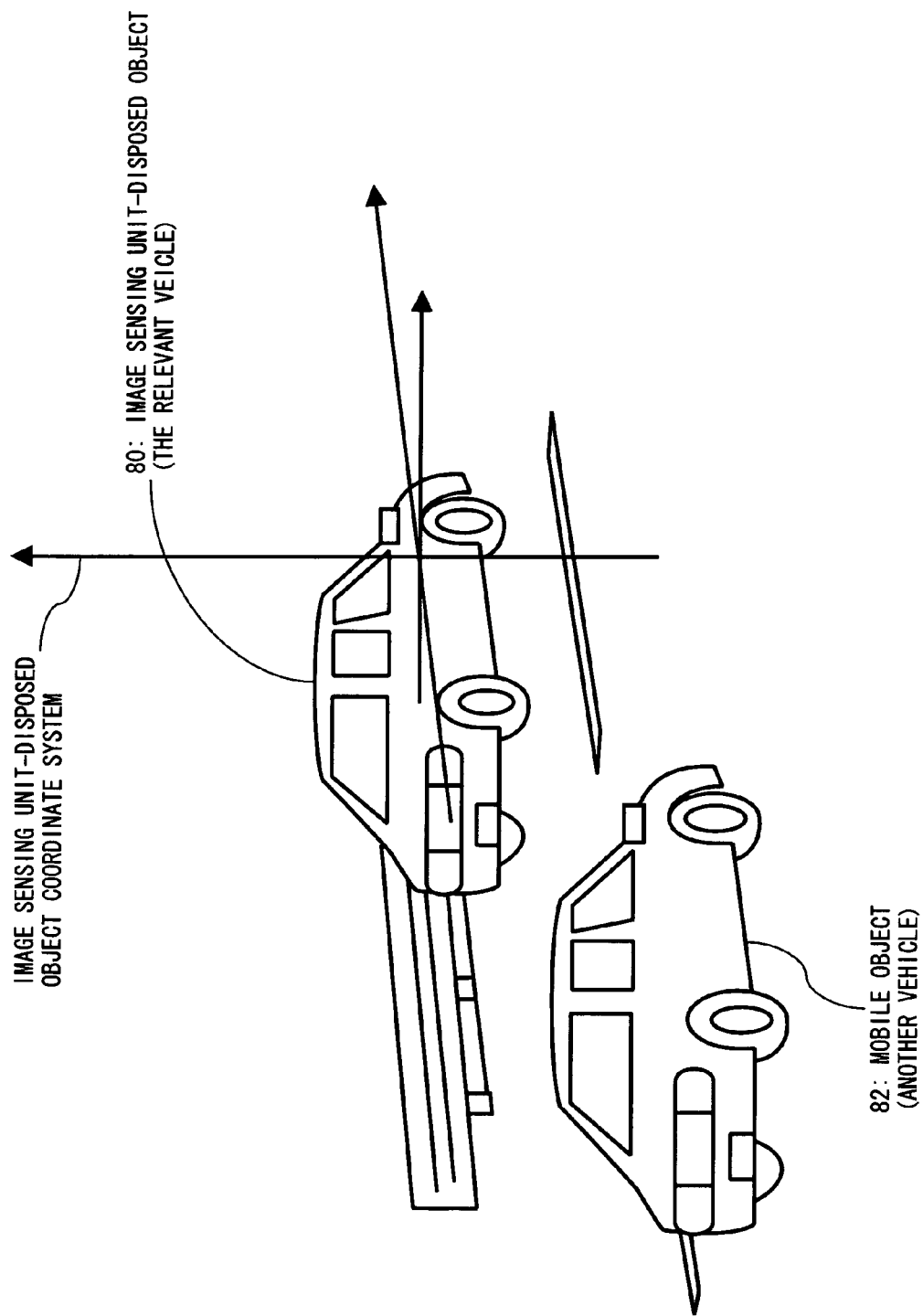
FIG. 3 shows the location relationship between the image sensing unit-disposed object (the relevant vehicle) and another vehicle.
Figure 4:
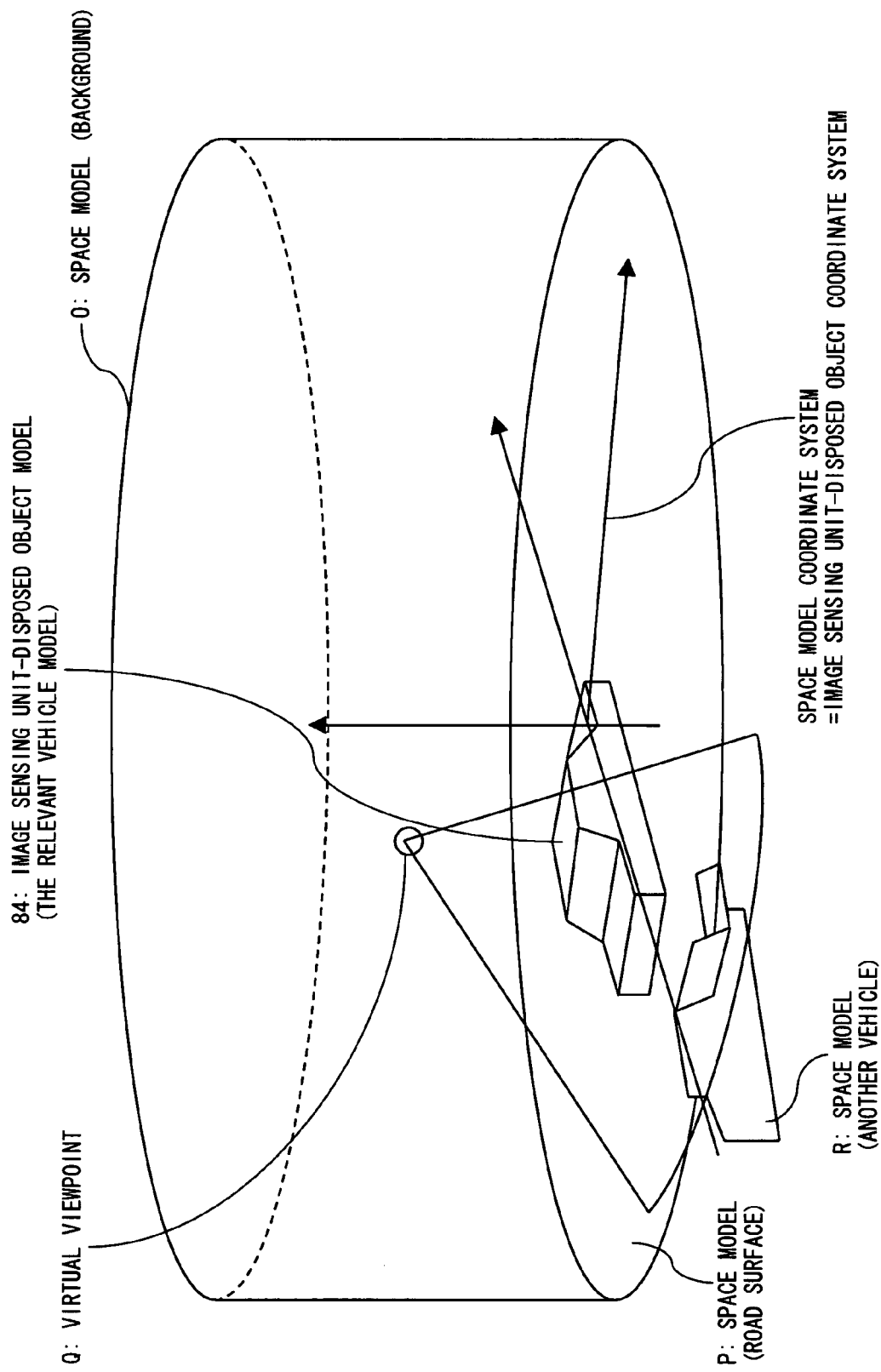
FIG. 4 shows the space model of the image sensing unit-disposed object.

In the present invention, when displaying a viewpoint-modified image via the viewpoint modification device 36, the model of the vehicle 10, being an image sensing unit-disposed object, is displayed in the viewpoint-modified image. Simultaneously, the change of the movable member of the image sensing unit-disposed object is detected and the relevant part of the image sensing unit-disposed object model in the viewpoint-modified image is transformed and displayed. This process is described below. Firstly, FIG. 3 shows the location relationship between the image sensing unit-disposed object (the relevant vehicle) and another vehicle. As shown in FIG. 3, another vehicle 82 is located behind the image sensing unit-disposed object (the relevant vehicle) 80. In such a location relationship, the space model shown in FIG. 4 is generated. An image sensing unit-disposed object model 84 is located at the center of a space model coordinate system, a cylinder type space model (background) O and a space model (road surface) P on a plane are formed and a virtual viewpoint Q is set obliquely down-and-backward from the upper part of the image sensing unit-disposed object model 84. As shown in FIG. 4, a space model (another vehicle) R is formed three-dimensionally viewed from the relevant vehicle side.

Figure 5A:
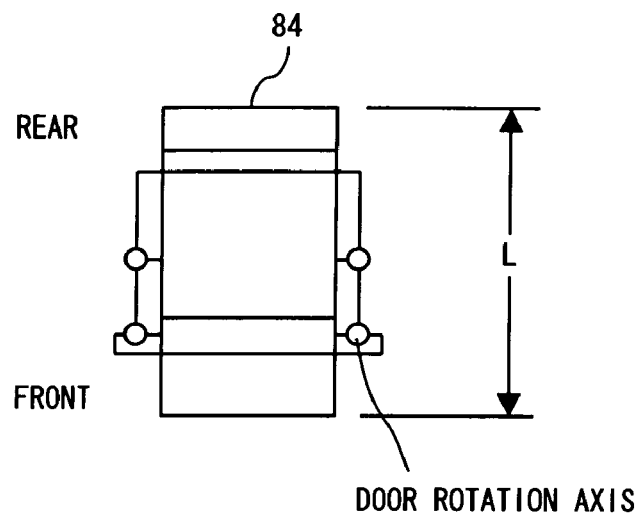
FIG. 5 shows a case where the image sensing unit-disposed object is a vehicle.
Figure 5B:
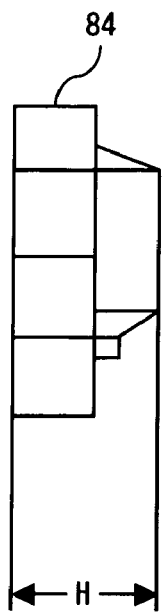
Figure 5C:
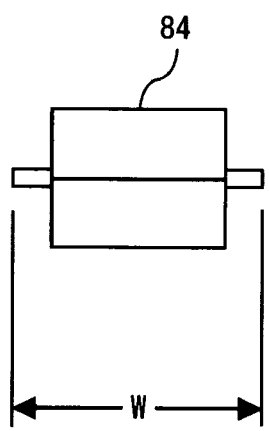
Figure 6:
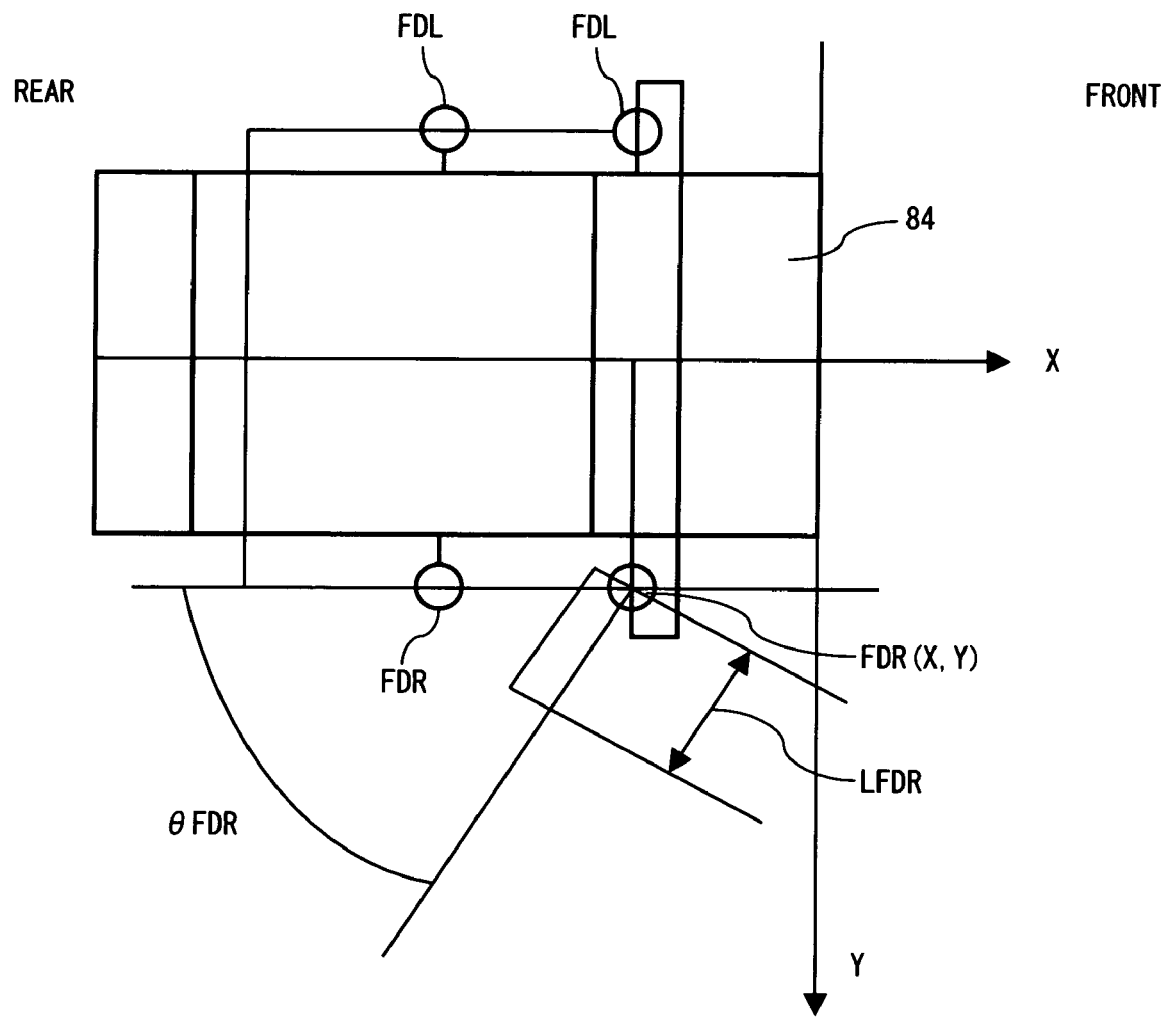
FIG. 6 shows the change of a model in the case where the right front door of the relevant vehicle is opened.

The image sensing unit-disposed object model 84 is stored as CAD data beforehand, and arbitrary one can be selected from a plurality of pieces of template data, such as a passenger car, a van, a truck and the like. FIGS. 5A through 5C show examples of the image sensing unit-disposed object model in the case where the image sensing unit-disposed object 80 shown in FIGS. 3 and 4 is a sedan type vehicle. FIGS. 5A, 5B and 5C are its top view, side view and front view, respectively, of the image sensing unit-disposed object model 84. FIG. 6 shows the change of a model in the case where the right front door of the relevant vehicle is opened. As shown in FIG. 6, in this model, the width W, length L, height H of an vehicle, the opening/closing angle of an door (for example, in the case of a right front door, θFDR (F: front, D: door and R: right), the position of a hinge FDR(X,Y), the length of a door LFDR and the like can be specified and the opening/closing of a door or the like can also be transformed.

In FIG. 6, the coordinates of the image sensing unit-disposed object is also disposed. As shown in FIG. 6, the front side of the image sensing unit-disposed object model 84 is set as the Y axis and the X axis is set in such a way as to be the center of the relevant vehicle and also to interest with the Y axis. The coordinates are fixed on the same axis as the space model coordinate system shown in FIG. 4. Thus, a space model can be generated on the basis of the coordinate system. Each door is provided with an opening/closing sensor, and the opening/closing angles θFDR, θFDL, θRDR and θFDL (F: front, D: door, R: right and L: left) of the four doors can be measured.

Figure 7:
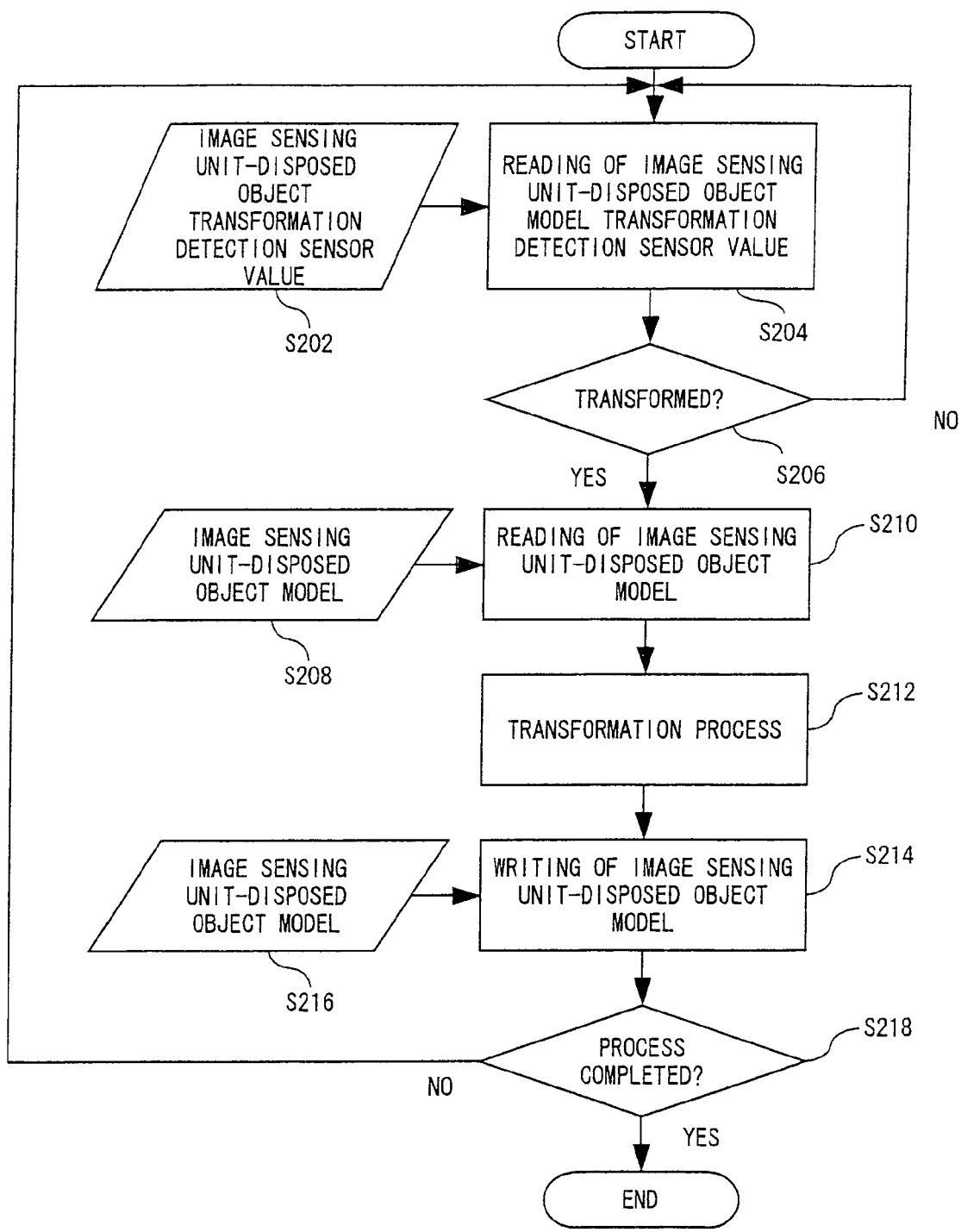
FIG. 7 is a flowchart showing the operation of an image sensing unit-disposed object model editing device.

FIG. 7 is a flowchart showing the operation of an image sensing unit-disposed object model editing device.

When an image sensing unit-disposed object transformation detection sensor 62 detects transformation (s202), the image sensing unit-disposed object model editing device 60 reads an image sensing unit-disposed object transformation detection sensor value (S204).

In S206, the image sensing unit-disposed object model editing device 60 determines whether the image sensing unit-disposed object model is transformed.

If the image sensing unit-disposed object model is transformed (Yes in S206), the image sensing unit-disposed object model editing device 60 reads the transformed image sensing unit-disposed object model (S208) from the image sensing unit-disposed object model storage device 64 (S210).

If no image sensing unit-disposed object model is transformed (No in S206), the process returns to the detection status of the detection sensor.

As one example, if a right front door is opened, the image sensing unit-disposed object model editing device 60 rotates the three-dimensional data of the image sensing unit-disposed object model along the door rotation axis, according to the value of the rotation angle θFDR of the door and performs the transformation process as shown in FIG. 6 (S212).

After the transformation process is completed, the image sensing unit-disposed object model is outputted to the image sensing unit-disposed object model storage device 64 and is stored in it (S214).

As to the transformed image sensing unit-disposed object model, it is determined whether the transformation process is terminated. If the transformation process is terminated (Yes in S218), the transformation process is terminated. If no transformation process is terminated, the process returns to the detection status of the detection sensor.

Space data is generated using this image sensing unit-disposed object model. Since this space data also includes the image sensing unit-disposed object model of the relevant vehicle, the image sensing unit-disposed object model is displayed in the viewpoint-modified image if a virtual viewpoint is located in a part where the vehicle can be observed.

Figure 8:
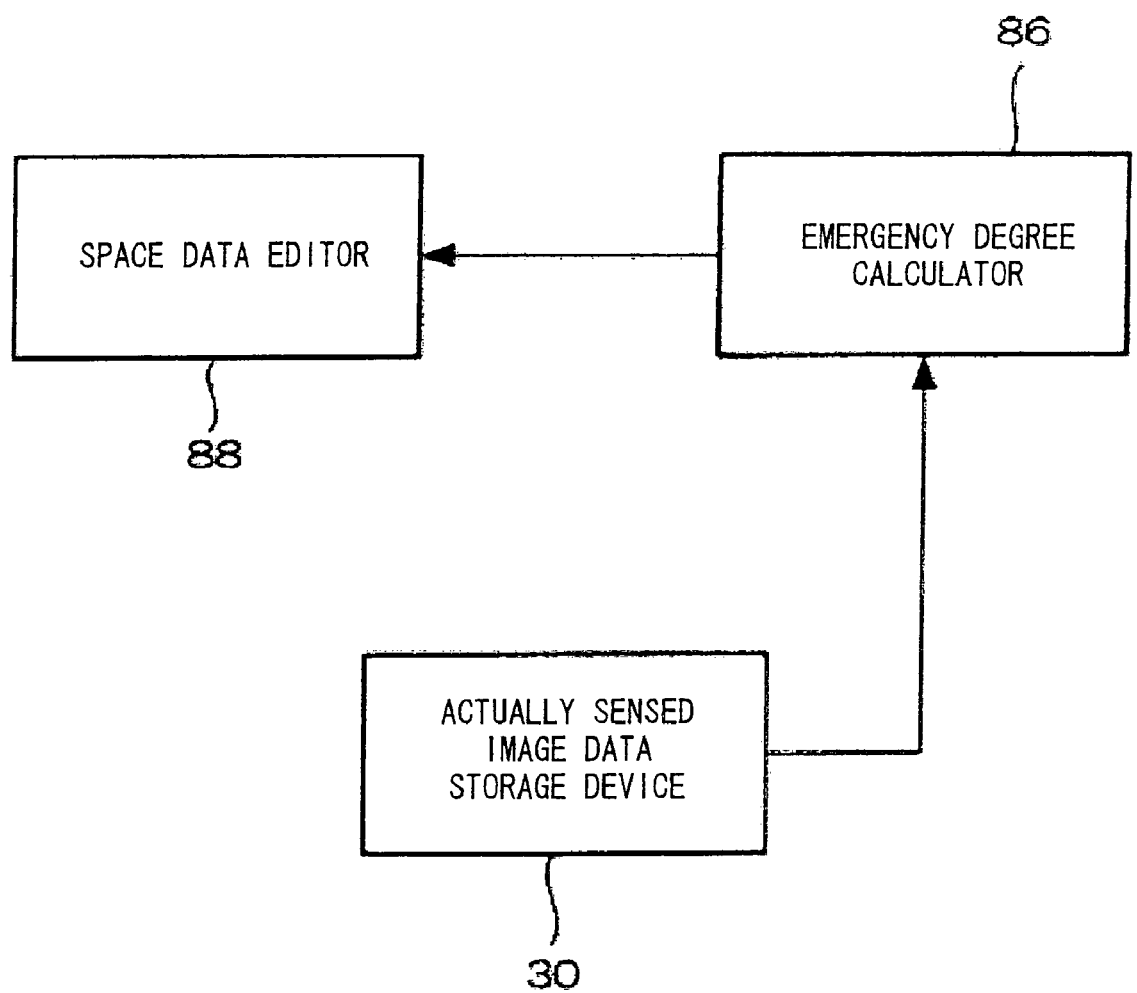
FIG. 8 shows the configuration of an emergency degree calculation device.

An emergency zone is displayed by an emergency degree calculation device, being the emergency information display unit shown in FIG. 8. An emergency degree calculation device 86 recognizes an obstacle, such as another vehicle or the like, based on the space data, the actual image data of the actually sensed image data storage device 30 or the like, and calculates the predicted route of the other vehicle or the like, based on its change. The emergency degree calculated in this way is distributed on the space model, and as to a highly emergent part, a space data editing device 88 changes the color of the space data and so on. An emergency zone is displayed by generating a virtual viewpoint-modified image, based on the space data.

Figure 9:
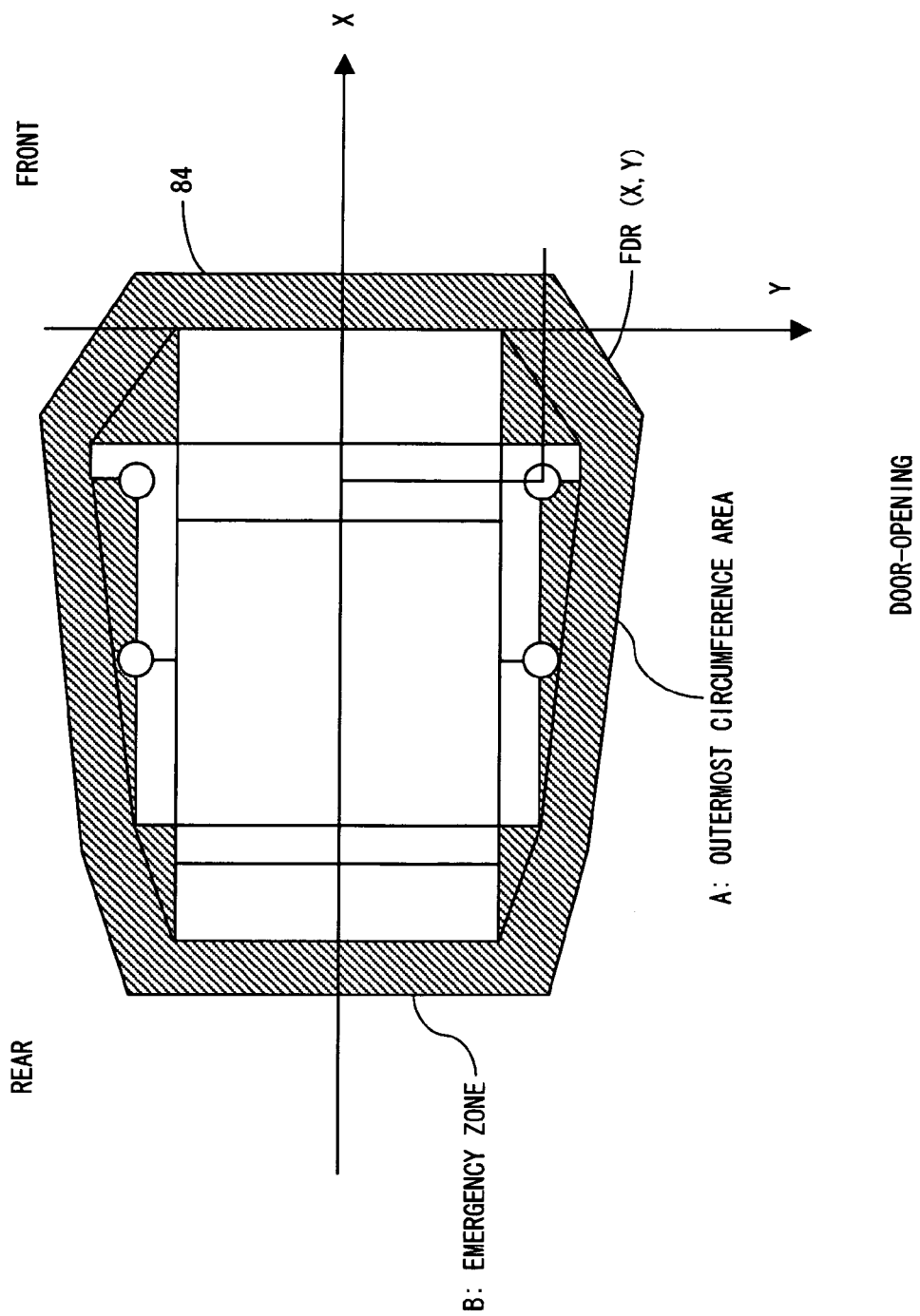
FIG. 9 shows the emergency zone based on the transformation of an image sensing unit-disposed object (No. 1).

Next, the transformation plotting method of an emergency zone based on the transformation of an image sensing unit-disposed object as the display method of an emergency zone is described with reference to FIGS. 9 through 11. As shown in FIG. 9, an area obtained by connecting the outermost circumference of the image sensing unit-disposed object model 84 is called an outermost circumference area A. Furthermore, a range obtained by expanding this outermost circumference area A by a predetermined amount is set as an emergency zone B.

Figure 11:
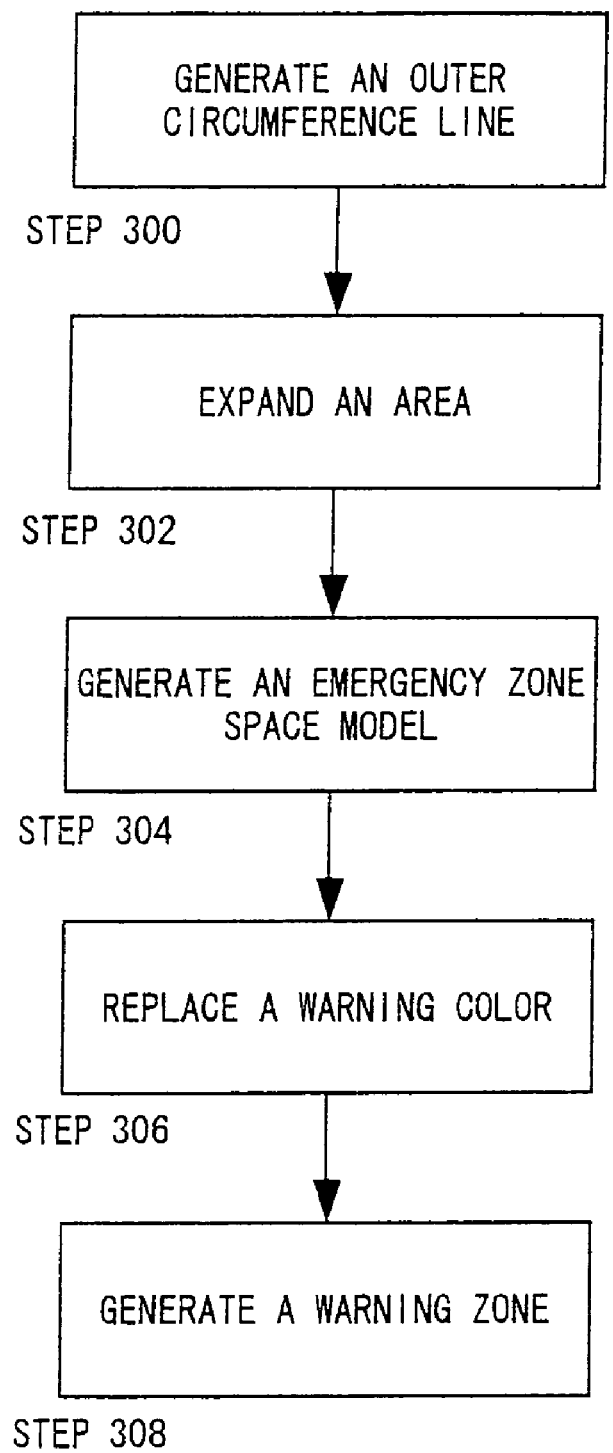
FIG. 11 is the flowchart of a transformation plotting method.

FIG. 11 is the flowchart of a transformation plotting method. An outer circumference line is calculated as an outermost circumference line for surrounding the image sensing unit-disposed object model 84 (S300). The outermost circumference line is expanded outside the image sensing unit-disposed object model 84 by a predetermined amount (S302) and an area surrounded by the outermost circumference line and the expanded outermost circumference line is called an emergency zone space model (S304). The color information, such as the brightness, saturation, hue and the like of each space data pointing the space model included in the emergency area space model is replaced with a warning color (for example, its hue is modified to red) (S306). A warning area whose color is modified to a warning color is generated on the space data (S308). By using this space data for a viewpoint-modified image, an emergency zone can be displayed according to the transformation of the image sensing unit-disposed object. The generated emergency zone corresponds to the area B shown in FIG. 9.

Figure 10:
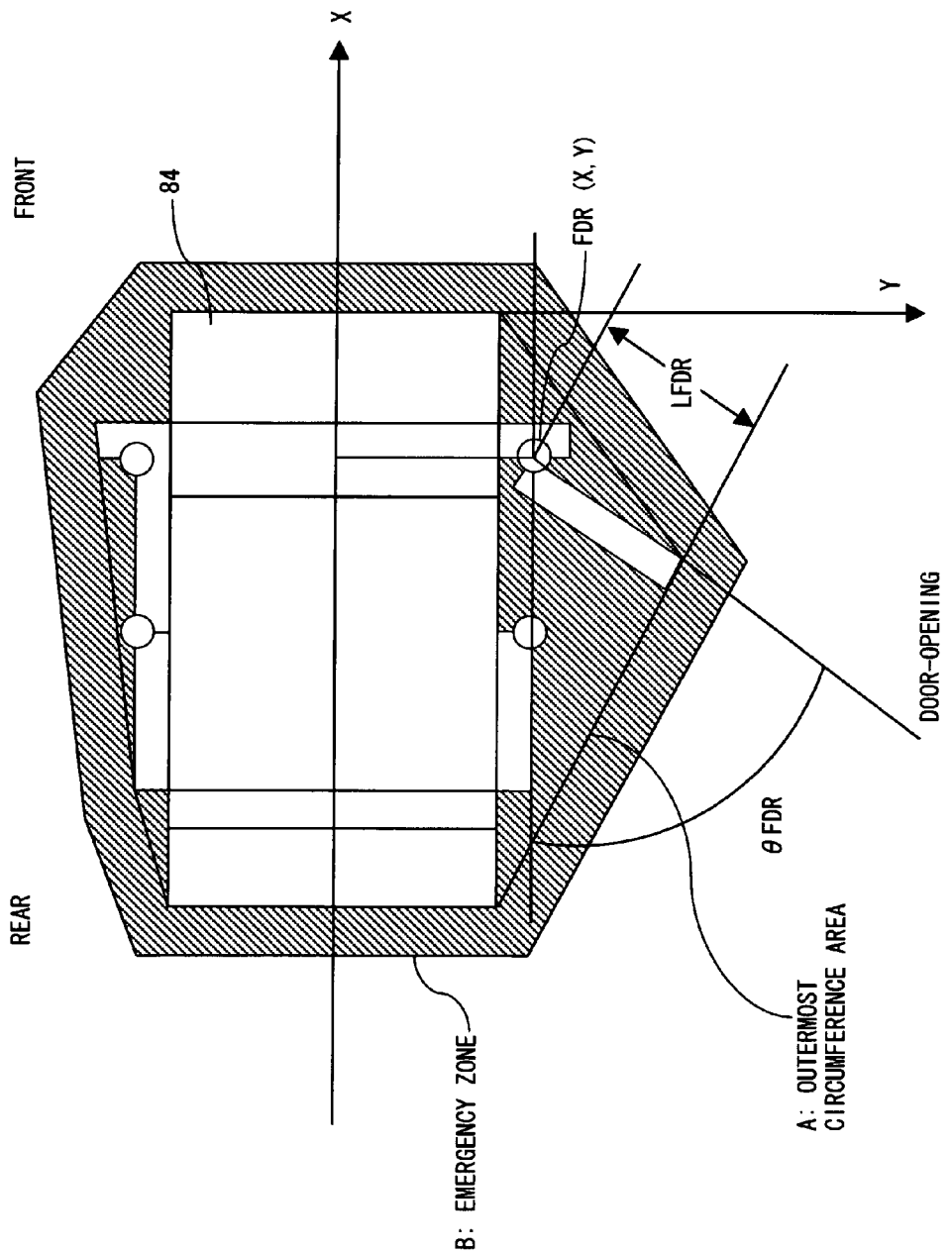
FIG. 10 shows the emergency zone based on the transformation of an image sensing unit-disposed object (No. 2).

As shown in FIG. 10, if the right front door (FDR) is opened, the emergency zone B also transforms according to the transformation of the image sensing unit-disposed object. Warning is displayed by setting the part in the space model and modifying the color of an image to be mapped in the viewpoint-modified image to, for example, red.

Figure 12:
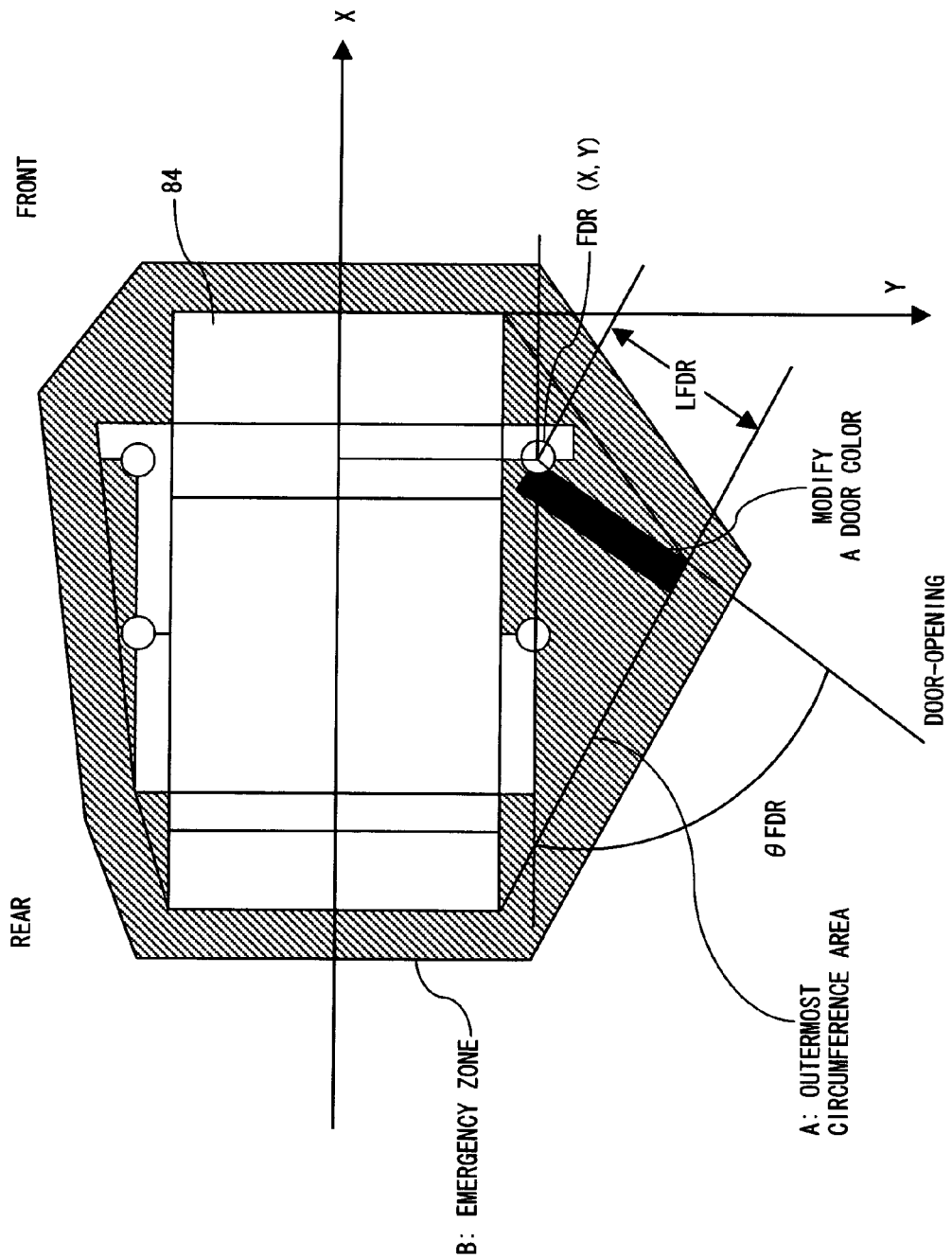
FIG. 12 shows the emergency-degree display of an image sensing unit-disposed object.

Furthermore, such emergency information is displayed by changing color. As shown in FIG. 12, in this case, the degree of emergency can also be displayed by changing the color of transformed door on the space data.

The setting of the virtual viewpoint of the viewpoint-modified image is modified according to the change of the movable member. When displaying the image sensing unit-disposed object model 84 in a bird's-eye image, the image sensing unit-disposed object model 84 is transformed and displayed, according to the condition of the relevant vehicle, such as the opening/closing status of a door or the like, and also color or the like is changed, according to the degree of approach. If an emergency degree calculation device 86 detects high emergency when the space data editing device 88 modifies the color of space to be edited, the way of modifying color can also be modified and displayed. In this case, the degree of approach between the emergency zone and the predicted route of another vehicle is used to determine whether the degree of emergency is high or low. It is determined that the closer to the emergency zone the predicted route is, the higher the degree of emergency is.

Figures 13A, 13B:
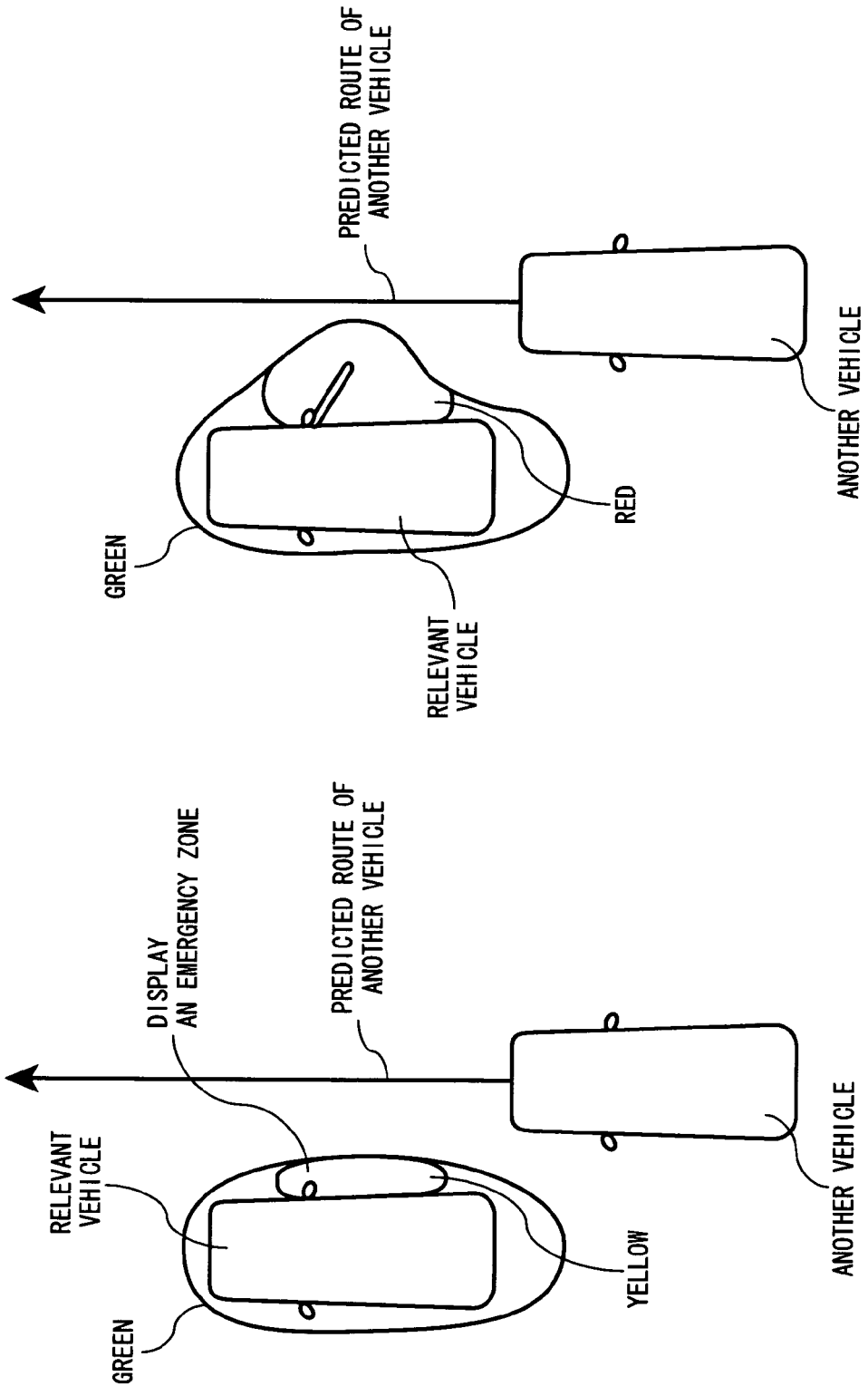
FIG. 13 shows the emergency degree color display of an image sensing unit-disposed object.

For example, as shown in FIGS. 13A and 13B, a part closer to the predicted route of the other vehicle has a color of the higher degree of warning. As shown in FIG. 13A, the low and middle degree of warning are displayed by green and yellow, respectively. Then, as shown in FIG. 13B, if a door is opened and the degree of warning is high, the surrounding area is displayed by red. The rewriting of the color information can be applied to the space data by the space data editing device. This emergency zone can be displayed on the same plane as the space model of the road surface. Alternatively, the emergency zone can be three-dimensionally set in the surrounding space of the image sensing unit-disposed object.

When setting a virtual viewpoint in order to display such an emergency zone or the degree of approach, the setting of a virtual viewpoint or the display of blind corner is modified according to the adjustment of a side mirror, a rear view mirror or the like. Specifically, if blind corner which should be displayed for a driver or the like changes due to, for example, the adjustment of a side mirror accompanying the update of the image sensing unit-disposed object model when setting a virtual viewpoint in order to display such an emergency zone or the degree of approach, a virtual viewpoint editing device 90 can also modify the operation of the image selection device 26 or the virtual viewpoint modification device 36 according to it by editing the virtual viewpoint data, outputting the data to a virtual viewpoint setting device 92 and writing the data into the virtual viewpoint storage device 94. The virtual viewpoint editing device 90 updates the image sensing unit-disposed object model, using a mirror angle sensor, a side mirror accommodation sensor and the like as an image sensing unit-disposed object transformation detection sensor 62 and also detects the change of an area which the driver can monitor, by a mirror or the like.

The virtual viewpoint editing device 90 modifies the preset position of the virtual viewpoint, according to the opening/closing of the hood of a convertible. The virtual viewpoint editing device 90 modifies the preset position of the virtual viewpoint, according to the state of a load. The virtual viewpoint editing device 90 updates the setting of the virtual viewpoint or the relevant vehicle model to be overlapped on the virtual viewpoint image, according to the motion of a towing trailer. Specifically, although in the above-described preferred embodiment, the opening/closing sensor of a door is used as the image sensing unit-disposed object transformation detection sensor 62, in this case, an opening/closing sensor is provided on the hood of the convertible, and the image sensing unit-disposed object model is updated according to it. Furthermore, if the visibility of the driver widely changes like this and a disposed camera is covered by a hood, the virtual viewpoint editing device 90 modifies the operation of the image selection device 26 or the virtual viewpoint modification device 36 according to the update of the image sensing unit-disposed object model by editing the virtual viewpoint data, outputting the data to the virtual viewpoint setting device 92 and writing the data into the virtual viewpoint storage device 94 since the selection of an image sensing device and the setting of a virtual viewpoint become inappropriate. Simultaneously, when detecting the opening/closing of the hood, the image sensing unit-disposed object model editing device 60 reads the image sensing unit-disposed object model from the image sensing unit-disposed object model storage device 64 and applies the transformation of its hood model to the three-dimensional data of the image sensing unit-disposed object model. The transformed image sensing unit-disposed object model is outputted to the image sensing unit-disposed object model storage device 64 and stored in it.

If infrared ray, a supersonic wave sensor or the like is used as the image sensing unit-disposed object transformation detection sensor 62 in order to detect a load, the position of the virtual viewpoint can be modified when the same problem as described above occurs due to a load on its loading platform, its towed vehicle or the like.

Specifically, if the image sensing unit-disposed object transformation detection sensor 62 detects the towing of the trailer when a vehicle tows a trailer, the image sensing unit-disposed object model editing device 60 reads the image sensing unit-disposed object model from the image sensing unit-disposed object model storage device 64, adds its trailer model to the three-dimensional data of the image sensing unit-disposed object model and transforms the image sensing unit-disposed object model. The transformed image sensing unit-disposed object model is outputted to the image sensing unit-disposed object model storage device 64 and stored in it.

Figure 14:
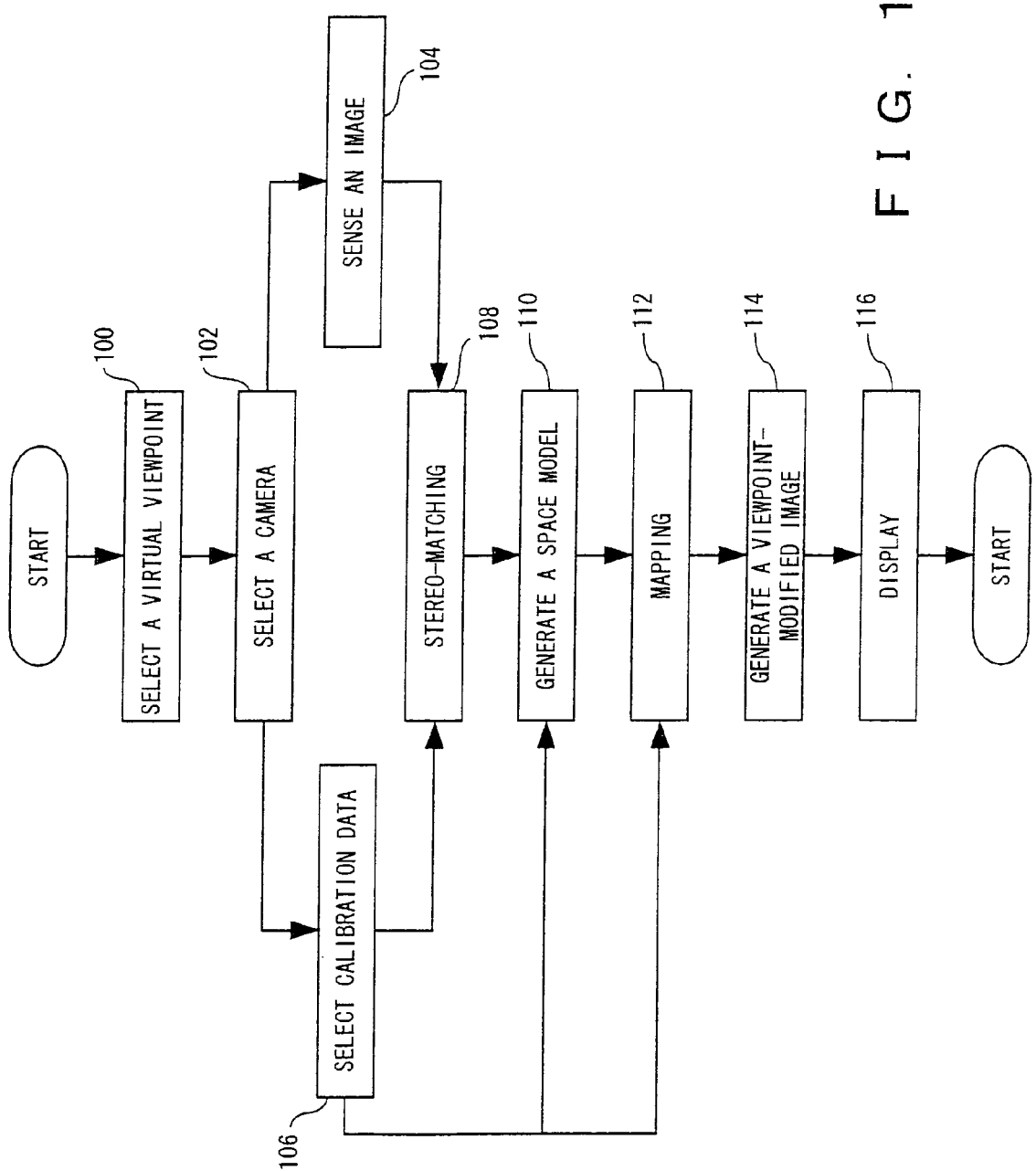
FIG. 14 is a flowchart showing the process of the image generation device of the preferred embodiment.

FIG. 14 is a flowchart showing the process of the image generation device of the above-described preferred embodiment. The generation method of a viewpoint-modified image is as follows.

Firstly, an arbitrary virtual viewpoint to be displayed is selected by the virtual viewpoint setting device 92 (S100).

Then, a camera to be used is selected from a plurality of cameras 12 (S102).

Then, images are sensed by the selected camera 12 (S104).

Calibration to be used for stereo matching is made beforehand by the calibration device 44, and calibration data, such as base line length, internal and external camera parameters, corresponding to the selected camera 12 is generated and selected (S106).

Then, stereo matching is applied to the selected sensed images, based on the obtained calibration data. Specifically, a correspondence points are retrieved by drawing a predetermined window from left and right stereo-projected images and calculating the value of normalized cross correlation or the like, of the window image and calculating a parallax between the respective pixels of the left and right images. A depth is calculated using the parallax, based on the calibration data, and the depth data obtained is specified as image depth data (S108).

Then, image data by the camera 12, image depth data by the depth measurement device 42 and an image sensing unit-disposed object model are inputted to the space re-organization device 32, being a space model update unit. By selectively using these at a desired depth, a more detailed space model is generated (S110). Then, actually sensed image data corresponding to this space model is mapped on a three-dimensional space model according to the calibration data and an image inputted from the image sensing unit is also mapped on the three-dimensional space model. Thus, a texture-mapped space data is generated (S112).

Then, referring to the space data generated by the space re-organization device 32, a viewpoint-modified image which is viewed from a desired virtual viewpoint is generated by the viewpoint modification device 36. (S114).

Then, the generated viewpoint-modified image data is displayed on the display device 40.

When generating a virtual viewpoint composite image in this process, the change of the movable member of an image sensing unit-disposed object is detected and the relevant part of the image sensing unit-disposed object model in the viewpoint-modified image or an image sensing unit-disposed object model is simultaneously displayed on the viewpoint-modified image. Simultaneously, the virtual viewpoint position of the viewpoint-modified image is changed and displayed, according to the amount of change of the movable member of the image sensing unit-disposed object.

Although in the above-described preferred embodiment, the image generation system is mounted on a vehicle and is used, by applying the system to an indoor monitor system, viewpoint-modification according to a change can also be realized. For example, the opening/closing status of a door in a room to be monitored can be checked, and the change of the door status of an electric appliance or furniture can be displayed.

Figure 15B:
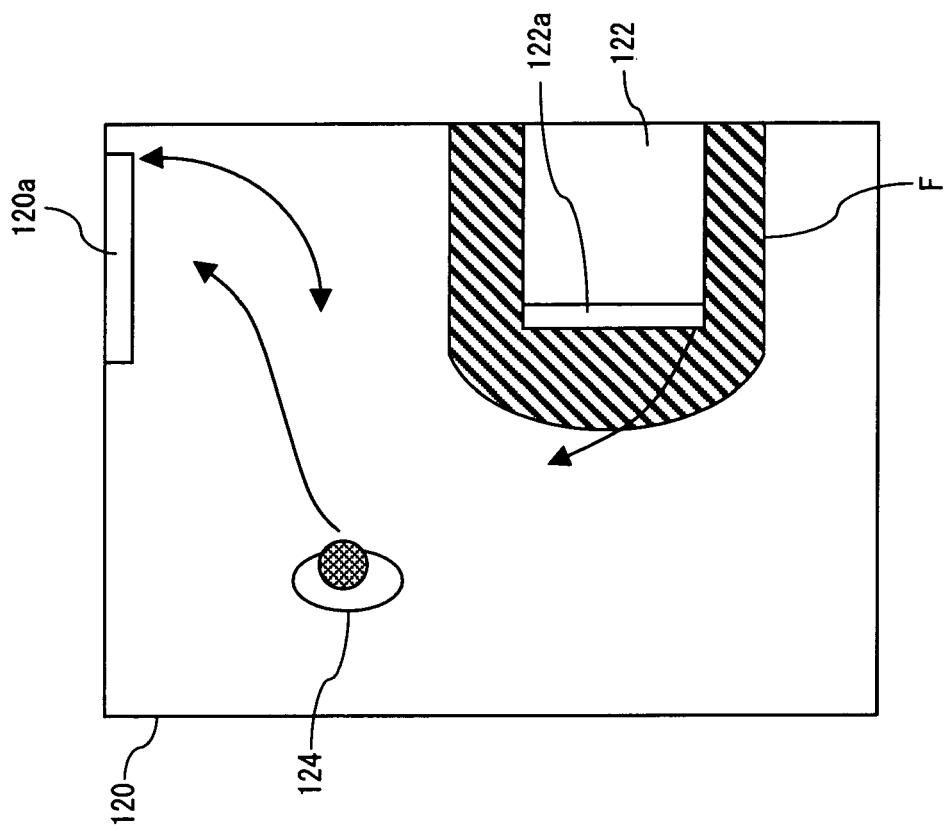
FIG. 15 shows the change of the movable member of an image sensing unit-disposed object by the image generation device when a door is opened/closed and an emergency zone in the case where the present invention is applied to an indoor monitor device.
Figure 15A:
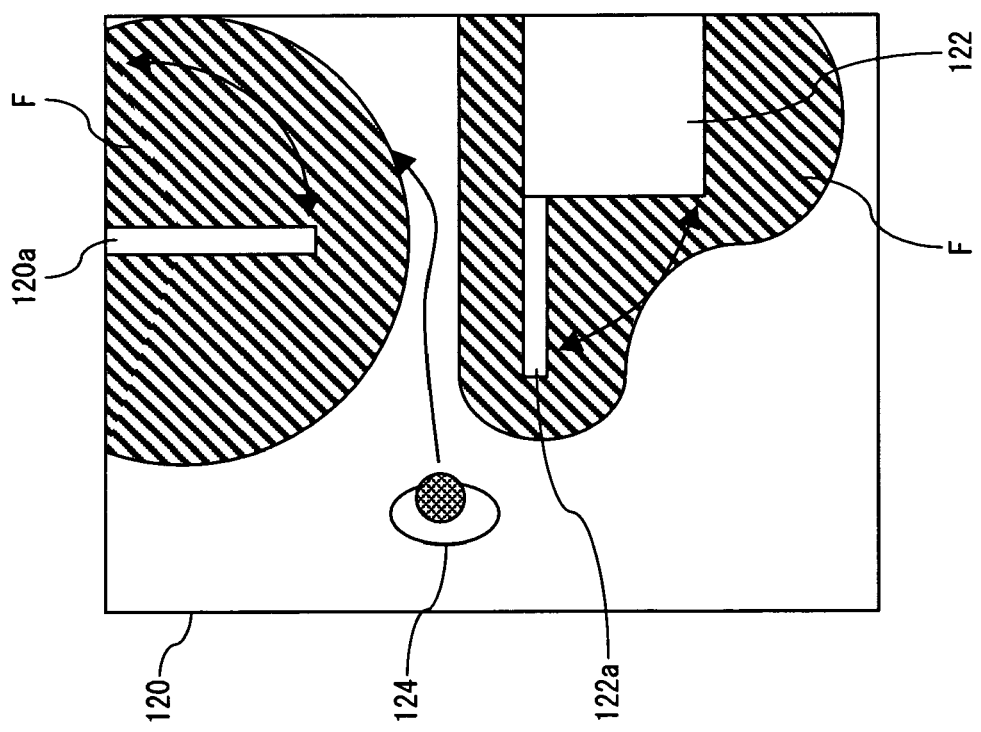

FIGS. 15A and 15B shows a case where the image sensing unit-disposed object corresponds a room 120 and furniture 122 and the movable object corresponds to a human being 124. In FIG. 15A, the door of the furniture 122a and the door of the room 120a are open, and its emergency zone F is widened accordingly. In FIG. 15B, the door of the furniture 122a and the door of the room 120a are closed, and the emergency zone F is narrowed. In this case, its equipment configuration is quite the same as that mounted on the vehicle.

By incorporating an image sensing unit-disposed object into the interior design of a room, the room can be monitored while generating a compatible life space. In this case, when a human being approaches an emergency zone, using space data, not only the degree of emergency can be displayed by the color change of a virtual viewpoint image but also the human being can be notified of the degree of emergency by an audio signal from a speaker, etc., vibration by a vibrator, etc., or the like, an addition to sight. It is preferable for a human being to be able to recognize the direction of the high emergency zone by switching stereo audio voice or a plurality of vibrators.

Although in the above-described preferred embodiment, an image sensing unit, such as the camera 12 or the like is installed in a vehicle or a monitor room, the same image can be generated even when the image sensing unit are installed in an indoor or outdoor image sensing unit-disposed object, such as a walking person, a street, a store, a house, an office or the like. By adopting such a configuration, the image generation device is also applicable to a monitor camera or a wearable computer or the like for obtaining video-based information.

What is claimed is:

1. An image generation method for generating a viewpoint-modified image based on camera information sensed by a plurality of image sensing units, each sensing an image around an image sensing unit-disposed object, comprising:
setting a three-dimensional space in which the image sensing unit-disposed object is disposed;
specifying the three-dimensional space by setting a virtual viewpoint being different from a respective viewpoint of each of the plurality of image sensing units;
generating a viewpoint-modified image by coordinate-transforming pixels of image data, based on the camera information sensed from the viewpoints of the plurality of image sensing units, to the three-dimensional space which is viewed from the virtual viewpoint, and by re-arranging the pixels on an image plane viewed from the virtual viewpoint;
displaying an image sensing unit-disposed object model on the viewpoint-modified image;
detecting a change of a movable member of the image sensing unit-disposed object
transforming and displaying a relevant part of the image sensing unit-disposed object model in the viewpoint-modified image reflecting the detected change in the movable member.

2. The image generation method according to claim 1, wherein
emergency information displayed is updated based on degree of approach of an obstacle, according to the transformation of the image sensing unit-disposed object model.

3. The image generation method according to claim 1, wherein
the emergency information is displayed by changing its color.

4. The image generation method according to claim 1, wherein
the setting of a virtual viewpoint of the viewpoint-modified image is modified according to the change of the movable member.

5. An image generation method for generating a viewpoint-modified image, based on image data obtained by one or a plurality of image sensing units mounted on an image sensing unit-disposed object, comprising:
setting a three-dimensional space in which the image sensing unit-disposed object is disposed;
specifying the three-dimensional space by setting a virtual viewpoint being different from a respective viewpoint of each of the plurality of image sensing units;
generating a viewpoint-modified image by coordinate-transforming pixels of image data, based on the image data obtained from the viewpoints of the plurality of image sensing unit, to the three-dimensional space which is viewed from the virtual viewpoint, and by rearranging the pixels on an image plane viewed from the virtual viewpoint;
displaying an image sensing unit-disposed object model on the viewpoint-modified image;
detecting a change of a movable member of the image sensing unit-disposed object; and
changing and displaying a virtual viewpoint position of the viewpoint-modified image, according to an amount of change of the movable member of the image sensing unit-disposed object.

6. The image generation method according to claim 5, wherein
the movable member includes a load externally mounted.

7. An image generation device, comprising:
a plurality of image sensing units mounted on an image sensing unit-disposed object for sensing an image around the image sensing unit-disposed object;
a viewpoint-modified image generation unit generating a viewpoint-modified image which is viewed from a set virtual viewpoint, based on image data obtained by the plurality of image sensing units and a space model;
an image sensing unit-disposed object model overlapping unit superimposing and displaying an image sensing unit-disposed object model on the viewpoint-modified image generation unit including:
a setting unit setting a three-dimensional space in which the image sensing unit-disposed object is disposed;
a specifying unit specifying the three-dimensional space by the setting a virtual viewpoint being different from a respective viewpoint of each of the plurality of image sensing units;
a generating unit generating a viewpoint-modified image by coordinate-transforming pixels of image data, based on the image data obtained from the viewpoints of the plurality of image sensing units, to the three-dimensional space which is viewed from the virtual viewpoint, and by re-arranging the pixels on an image plane viewed from the virtual viewpoint; and
an image sensing unit-disposed object model update unit transforming and displaying a display form of the relevant part of the image sensing unit-disposed object model, based on change of a movable member of the image sensing unit-disposed object.

8. The image generation device according to claim 7, wherein
the viewpoint-modified image generation unit comprises an emergency information display unit displaying an emergency, according to a movable member position updated by said image sensing unit-disposed object model update unit and a degree of approach to a displayed obstacle.

9. The image generation device according to claim 7, further comprising
a viewpoint modification unit modifying a virtual viewpoint of the viewpoint-modified image, based on the change of the movable member of the image sensing unit-disposed object.

10. The image generation device according to claim 7, wherein
the image sensing unit-disposed object is a vehicle.

* * * * *